Dec. 8, 1931.  J. J. DANTE  1,834,939
SWITCH HANDLE ATTACHING MEANS
Filed Jan. 22, 1929   2 Sheets-Sheet 1
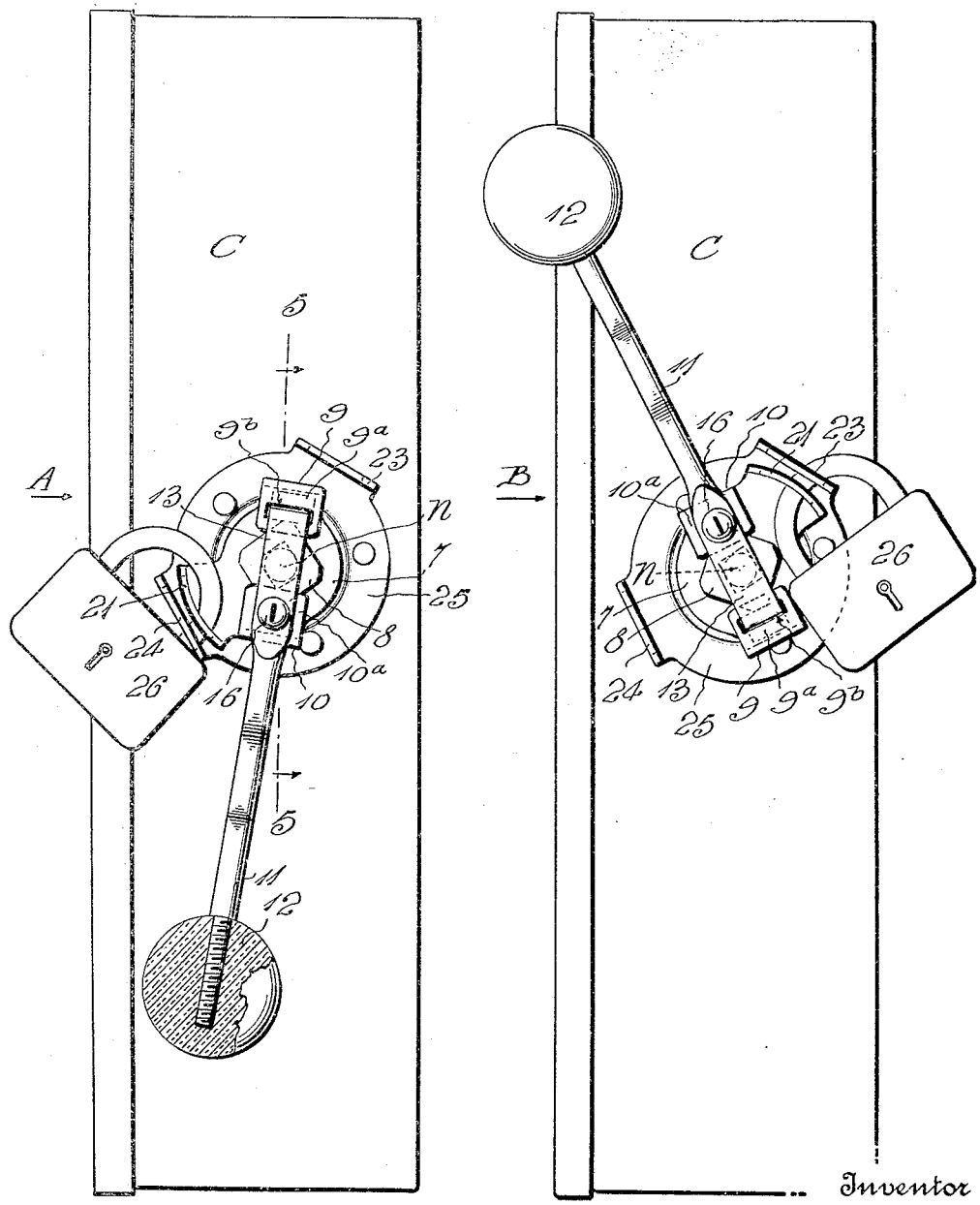
Witness
H. Woodard
Inventor
J. J. Dante
By H. B. Willson &co.
Attorneys

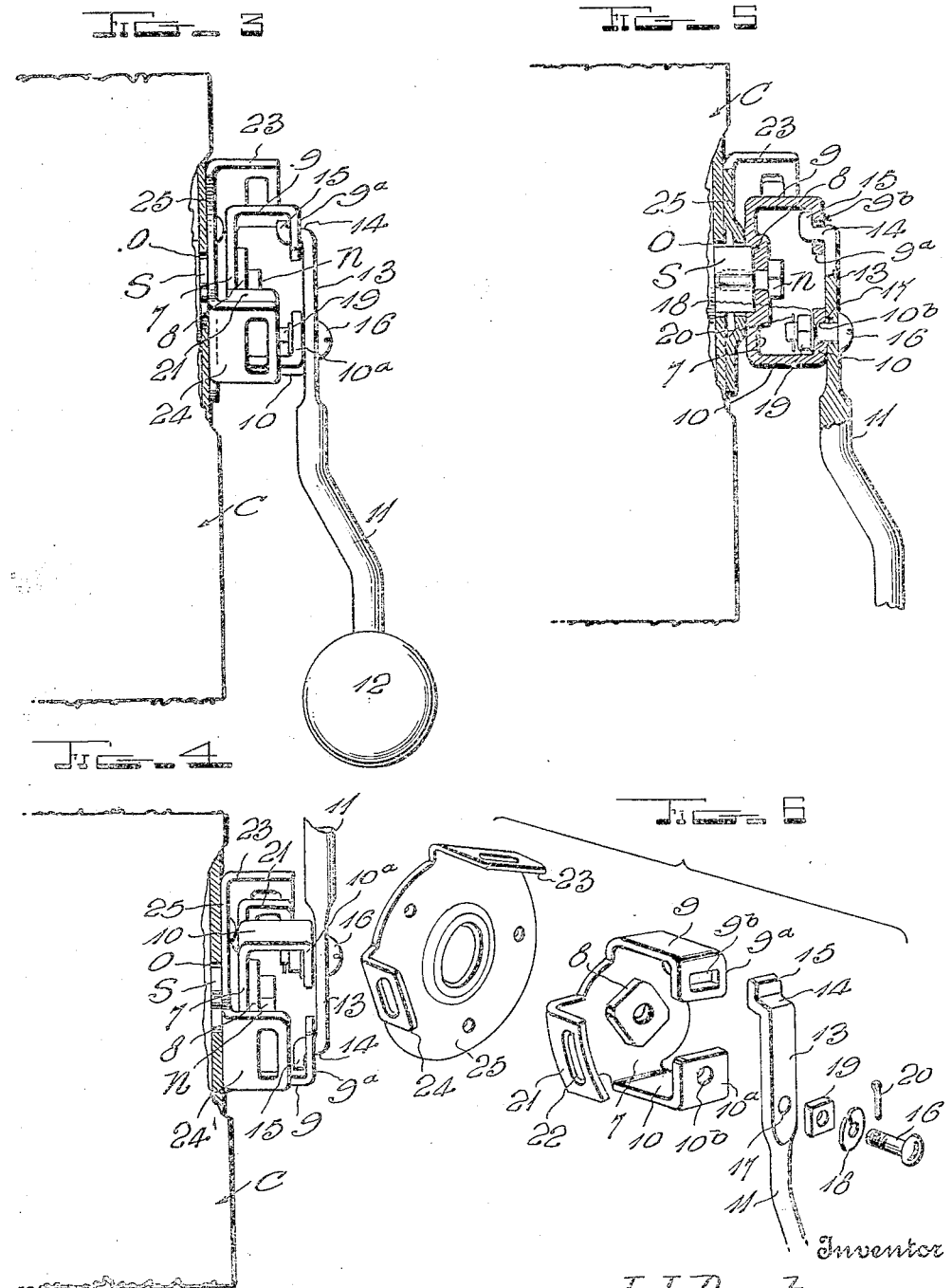

Patented Dec. 8, 1931

1,834,939

UNITED STATES PATENT OFFICE

JOSEPH J. DANTE, OF BANTAM, CONNECTICUT, ASSIGNOR, BY MESNE ASSIGNMENTS, TO THE TRUMBULL-VANDERPOEL ELECTRIC MANUFACTURING COMPANY, OF LITCHFIELD, CONNECTICUT, A CORPORATION OF DELAWARE

SWITCH HANDLE ATTACHING MEANS

Application filed January 22, 1929. Serial No. 334,301.

The invention relates to handles for electrical switches and is designed primarily for use with switches of the encased type, and it is the principal object of the invention to provide new and improved means for connecting the handle with a member to be operated thereby, the construction being such that said handle may be shipped within the switch casing and easily applied when the switch is installed. It is to be understood however that the invention is not restricted to use with encased switches even though this is the primary intent.

With the foregoing in view, the invention resides in the novel subject matter hereinafter described and claimed, description being accomplished by reference to the accompanying drawings.

Figure 1 is a side elevation showing the handle secured in switch-open position.

Fig. 2 is a view similar to Fig. 1 but showing the handle secured in switch-closed position.

Fig. 3 is an elevation looking in the direction indicated by the arrow A of Fig. 1.

Fig. 4 is a similar view as indicated by arrow B of Fig. 2.

Fig. 5 is a vertical sectional view on line 5—5 of Fig. 1.

Fig. 6 is a disassembled perspective view of a number of closely related parts.

In the drawings above briefly described, C denotes a switch casing which may contain any desired form of switch and operating means for said switch. A squared shaft S is shown projecting outwardly through an opening O in the casing, and the handle serves to turn this shaft in one direction or the other as occasion may demand.

A metal plate 7 is shown provided with a socket 8 which receives the outer end of the shaft S, said plate being secured upon said shaft by a central screw N. In this or some other adequate way, plate 7 is connected to shaft S to effect turning of the latter when said plate is turned. At opposite points, lugs 9 and 10 are shown extending laterally in the same direction from the peripheral portion of the plate 7, the outer ends 9a—10a of said lugs being bent inwardly toward each other and having openings 9b—10b respectively. Opening 9b is preferably in the form of an elongated rectangular slot while opening 10b is by preference of circular outline.

An operating handle 11 is shown provided at its outer end with an insulating hand-grip 12 which is preferably in the form of a ball threaded upon said handle end. The other end portion of the handle 11 is by preference flattened as indicated at 13 and the outer extremity of this flattened portion is offset, providing a transverse shoulder 14 for reception in the slot 9b when the handle is rocked in the proper direction. When this shoulder 14 is completely received in the slot 9b, it abuts the walls of this slot, the flattened portion 13 at one side of said shoulder lies against the outer sides of the lug ends 9a—10a, and the inner handle extremity 15 lies against the inner side of the lug end 9a. The handle is thus connected with the plate 7 in such a manner that it may be removed from this plate only by outward swinging, and to prevent such swinging, a bolt 16 is employed. This bolt passes through an opening 17 in the flat handle portion 13 and through the opening 10b of the lug end 10a. A lock washer 18 is preferably provided for the nut 19 of the bolt 16, and as a further precaution against accidental loosening of the handle, a cotter pin 20 preferably passes through the free end of said bolt.

In practice, the handle 11 with the parts 12—16—18—19—20 connected with it, is packed within the casing C and hence there is no danger of bending the handle in rough handling of the switch. When the switch is installed, the bolt 16 and associated parts are removed from the handle, the offset end of the latter is engaged with the slot 9b by first inserting the terminal 15 through said slot and then swinging the handle toward the lug end 10a, and when this has been done, the bolt 16 is passed through the openings 17—10b, and the parts 18—19—20 are applied. The handle is thus rigidly connected with the plate 7 to serve as turning means for the latter to effect either opening or closing of the switch. Should it be desired at any time to prevent unauthorized persons from operating the switch, it will also be observed that the handle may be quickly and easily detached.

In the preferred form of construction, a lateral locking lug 21 is formed integrally with the plate 7, said lug being formed with a slot 22 for registration with similar slots in either of two stationary lugs 23—24 carried by the casing C, said lugs 23—24 being preferably integral with an annular plate 25 riveted or otherwise secured to said casing around the shaft S. A padlock 26 is shown for locking lug 21 to either of the lugs 23—24, allowing the switch to be locked either in open or closed positions.

Not only is the construction herein disclosed of exceptionally simple and inexpensive nature, but it is efficient, reliable and advantageous from numerous standpoints. For these reasons, the details which have been illustrated are preferably followed. However, within the scope of the invention as claimed, variations may be made.

I claim:—

1. In a switch operating means, a member for connection with a switch-throwing part, said member having a lug formed with an opening, a handle having an offset end providing it with a transverse shoulder, said shoulder passing through and abutting the walls of said slot, and the handle portions at opposite sides of said shoulder being disposed against opposite sides of said lug, whereby the offset handle end can be removed from the lug only by swinging of the handle, and means spaced from said offset end and securing the handle to the aforesaid member to prevent such swinging of the handle.

2. In a switch operating means, a member for connection with a switch-throwing part, said member having two spaced laterally projecting lugs each formed with an opening, a handle having an end receivable in the opening of one of said lugs, and a fastener engaged with the handle and receivable in the opening of the other lug for securing said handle against disengagement from the opening of said one lug.

3. In a switch operating means, a plate for connection with a switch-throwing part, said plate having two opposed peripheral lugs both projecting laterally from one of its sides, the outer ends of said lugs being bent inwardly toward each other, a handle lying against the outer sides of said inwardly bent lug ends, and means securing said handle to said lug ends.

4. In a switch operating means, a plate for connection with a switch-throwing part, said plate having two opposed peripheral lugs both projecting laterally from one of its sides, the outer ends of said lugs being bent inwardly toward each other and each having an opening, a handle lying against the outer sides of said lug ends and having an offset end providing a shoulder which is received in one of said openings, whereby said handle may be disengaged from said one opening only by outwardly swinging said handle, and a fastener engaged with the handle and the other of said openings for holding said handle against such swinging.

In testimony whereof I have hereunto affixed my signature.

JOSEPH J. DANTE.